Patented Apr. 21, 1925.

1,534,930

UNITED STATES PATENT OFFICE.

HENRY V. DUNHAM, OF MOUNT VERNON, NEW YORK.

TREATMENT OF INDIA RUBBER FOR USE IN CHEWING GUM.

No Drawing.   Application filed December 29, 1922.   Serial No. 609,759.

*To all whom it may concern:*

Be it known that I, HENRY VAIL DUNHAM, a citizen of the United States, residing at Mount Vernon, in the county of Westchester and State of New York, have invented certain new and useful Improvements in the Treatment of India Rubber for Use in Chewing Gum, of which the following is a specification.

This process has for its object the treatment of india rubbers such as Pará, plantation and the like, in such a manner that their natural elasticity is greatly reduced and the mass acquires a plastic character and masticatory properties which allow of its use in the manufacture of chewing gum.

The process consists in the breaking down of the resilience of the rubber by heating at a suitable temperature with an oil, fat or wax, and subsequently, if desired, removing a portion or all of the said oil, fat or wax.

I have found that a large variety of fats, oils and waxes, or mixtures of the same may be used for this purpose if proper care be taken in following out the essentials of the process. Of the large number of suitable oils, fats and waxes I mention as examples soya bean oil, peanut oil, stearin, palmitin, paraffin and japan wax, without however limiting myself to the use of these particular substances.

The following examples may be given to illustrate the method of employing the process:

*Example I.*—200 pounds of commercial peanut oil are placed in a jacketed kettle and heated by steam or other heating medium to about 150° C. 800 pounds of shredded Pará or plantation rubber are then gradually added with efficient stirring, the aforesaid temperature being maintained. The rubber gradually swells and a stiff mass is produced, which, on continued heating and mixing, softens to a uniform smooth-flowing mixture. This operation is usually complete after one to three hours, depending on the efficiency of the mixer. The mixture may then be drawn off and allowed to cool, or it may be run directly from the mixing kettle into a tank containing an aqueous solution of an alkali for the purpose of extracting a part or the whole of the peanut oil used. The alkali may be caustic soda or sodium carbonate. With the above I might employ 24 pounds of a 5% solution of caustic soda (sufficient to remove about 90% of the oil), or I might use 27 parts of a 5% solution thereof (sufficient to remove substantially the entire amount of the oil). In the latter case the rubber-oil mixture is boiled and agitated with the alkiline liquor for two or more hours and then allowed to settle, after which the liquor is drawn off and the mass repeatedly washed with fresh, boiling water. The washing may be considered complete when the wash-water coming from the material is clear and has no alkaline reaction. The rubber mass is freed from excess moisture in any desired manner and is then ready for use as an admixture in the making of chewing gum or chewing gum base.

*Example II.*—400 pounds of stearin are melted and heated in a kettle or suitable receptacle to about 150° C. 600 pounds of shredded plantation rubber are gradually added and the mixture heated and stirred as in Example I. After about two to three hours a uniform liquid product is obtained which may be run into molds to cool, or may be treated with an alkali wash as described under Example I.

*Example III.*—350 pounds of japan wax are melted and heated to about 150° C., with the addition of 650 pounds of Pará rubber as in Example I, and the product run into molds or extracted as before described.

*Example IV.*—100 pounds of paraffin are melted and heated in a suitable vessel to about 150° C.; 100 pounds of shredded plantation rubber are gradually added, with efficient stirring, the temperature being maintained at approximately 150° C., for about two to three hours. The product is then ready for use or it may be mixed with 100 pounds of stearin and the whole submitted to an alkaline wash.

*Example V.*—100 pounds of paraffin and 200 pounds of stearin are melted together and heated in a suitable vessel at about 150° C., with the addition of 300 pounds of Pará rubber as in Example I. The product may be cooled and used without further treatment, or it may submitted to an alkaline wash as above described.

It is understood that other oils, fats or waxes, or mixtures thereof, can be used in the above examples and that the proportion of these to the amount of rubber can be varied, such variation being determined by the nature of the rubber employed and the specific action of the different oils, fats or waxes.

In the alkali treatment, if all of the oil, fat or wax is saponified or emulsified, it will be removed in the subsequent washing; if only a part of these substances is saponified or emulsified, some of the unchanged oil, fat or wax may remain in the product. If desired, I can leave in a substantial portion of the oil, fat or wax used, depending upon various conditions, such as the character of the oil, especially its hardness. With peanut oil, I might leave in 10% of the amount of oil used, with heavy stearin I might leave in about 80% thereof, and with japan wax, I might leave in about 95%; these correspond respectively with the following, as ultimate products:—100 rubber to 2½ peanut oil, 100 rubber to 53 stearin, 100 rubber to 50 japan wax. The removal of paraffin, which is not saponified by alkalies, can be effected by melting into the mass, prior to the alkali treatment, an amount of stearin equal to that of the paraffin present.

As an example of the use of the finished product in the making of chewing gum, the following formula may be given:—rubber-stearin mixture (containing 50% rubber), 33⅓ parts; balsam tolu, 33⅓ parts; gum chicle, 33⅓ parts; with the desired amounts of sweetening and flavoring ingredients.

The term "oleaginous material" as used below, is intended to embrace oils, hydrogenated oils, fats, waxes, fatty acids and equivalent materials, as well as mixtures of two or more of such materials.

The preferred temperature is stated in the above examples to be around 150° C. If a substantially lower temperature be used, the time required is much longer, while if a much higher temperature be used, the product is not so good for the purpose stated. Temperatures from 100° C., up to 200° C., may be used.

I claim:

1. A process for destroying or modifying the elasticity of india rubber by heating it together with an oleaginous material of the aliphatic series to a temperature between 100 and 200° C. until the combination acquires the requisite consistency for use in a chewing gum.

2. A process for destroying or modifying the elasticity of india rubber by heating it together with an oleaginous material and thereafter at least partially removing the last named material, whereby a plastic material suitable for use in a chewing gum is obtained.

3. A process of making a chewing-gum ingredient from unvulcanized rubber which comprises heating the rubber with a saponifiable oleaginous material to a temperature above 100° C., and below 200° C., for several hours, thereafter saponifying at least a substantial part of such oil, fat or wax and washing the product.

In testimony whereof I affix my signature.

HENRY V. DUNHAM.